Sept. 6, 1966 W. R. NISBET 3,270,490
COTTON SCRAPPER

Filed Nov. 5, 1963 5 Sheets-Sheet 1

FIG. I.

INVENTOR
W. R. NISBET

BY Munson H. Lane

ATTORNEY

Sept. 6, 1966  W. R. NISBET  3,270,490
COTTON SCRAPPER

Filed Nov. 5, 1963  5 Sheets-Sheet 2

INVENTOR
W. R. NISBET

BY  Munson H. Lane
ATTORNEY

Sept. 6, 1966 W. R. NISBET 3,270,490
COTTON SCRAPPER
Filed Nov. 5, 1963 5 Sheets-Sheet 3
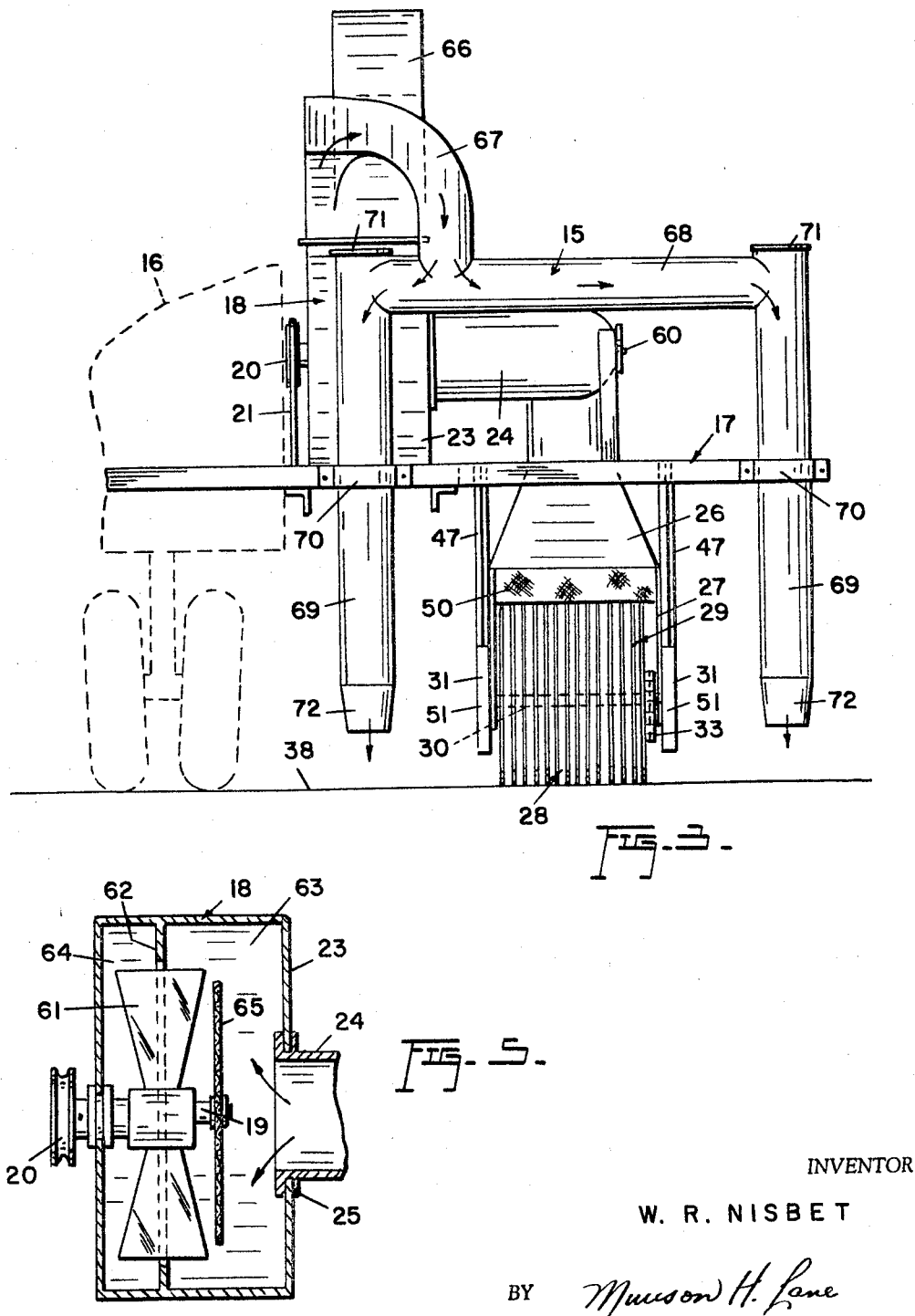
INVENTOR
W. R. NISBET
BY Munson H. Lane
ATTORNEY Sept. 6, 1966     W. R. NISBET     3,270,490
COTTON SCRAPPER
Filed Nov. 5, 1963     5 Sheets-Sheet 4
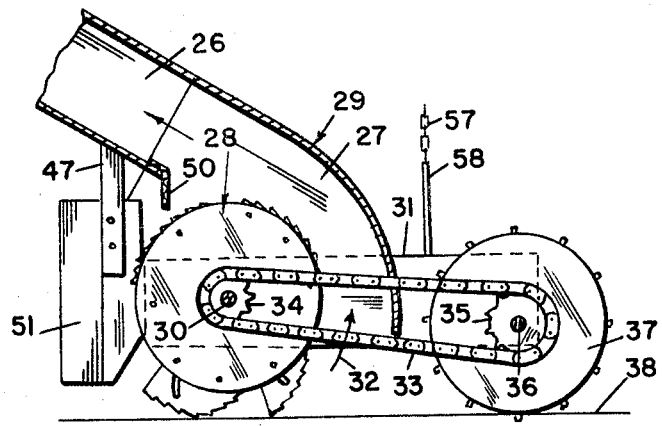
FIG-6-
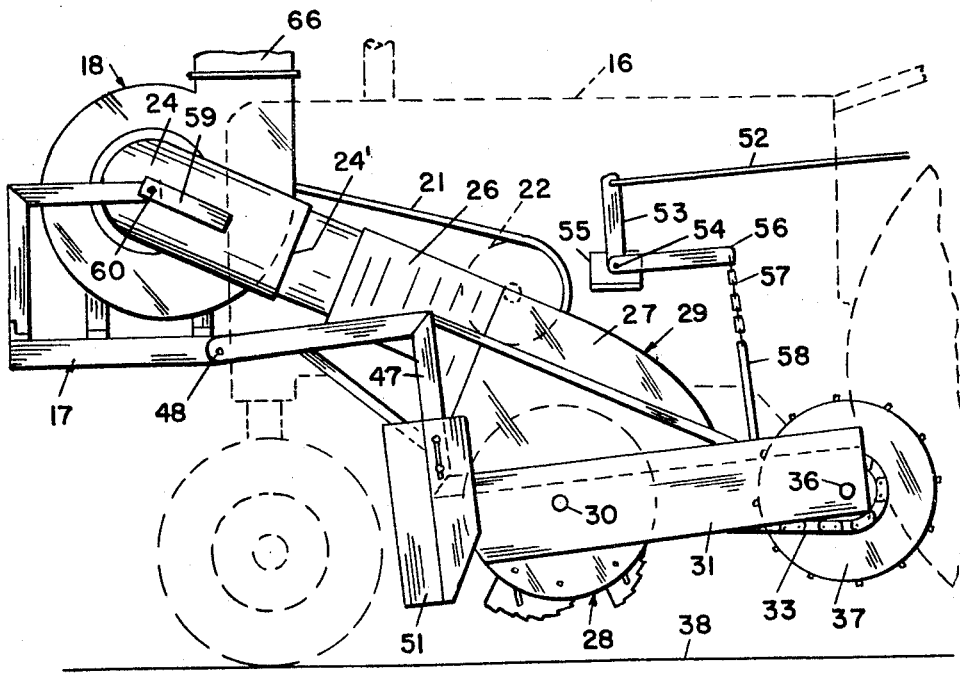
FIG-4-
INVENTOR
W. R. NISBET
BY Munson H. Lane
ATTORNEY Sept. 6, 1966  W. R. NISBET  3,270,490
COTTON SCRAPPER
Filed Nov. 5, 1963  5 Sheets-Sheet 5
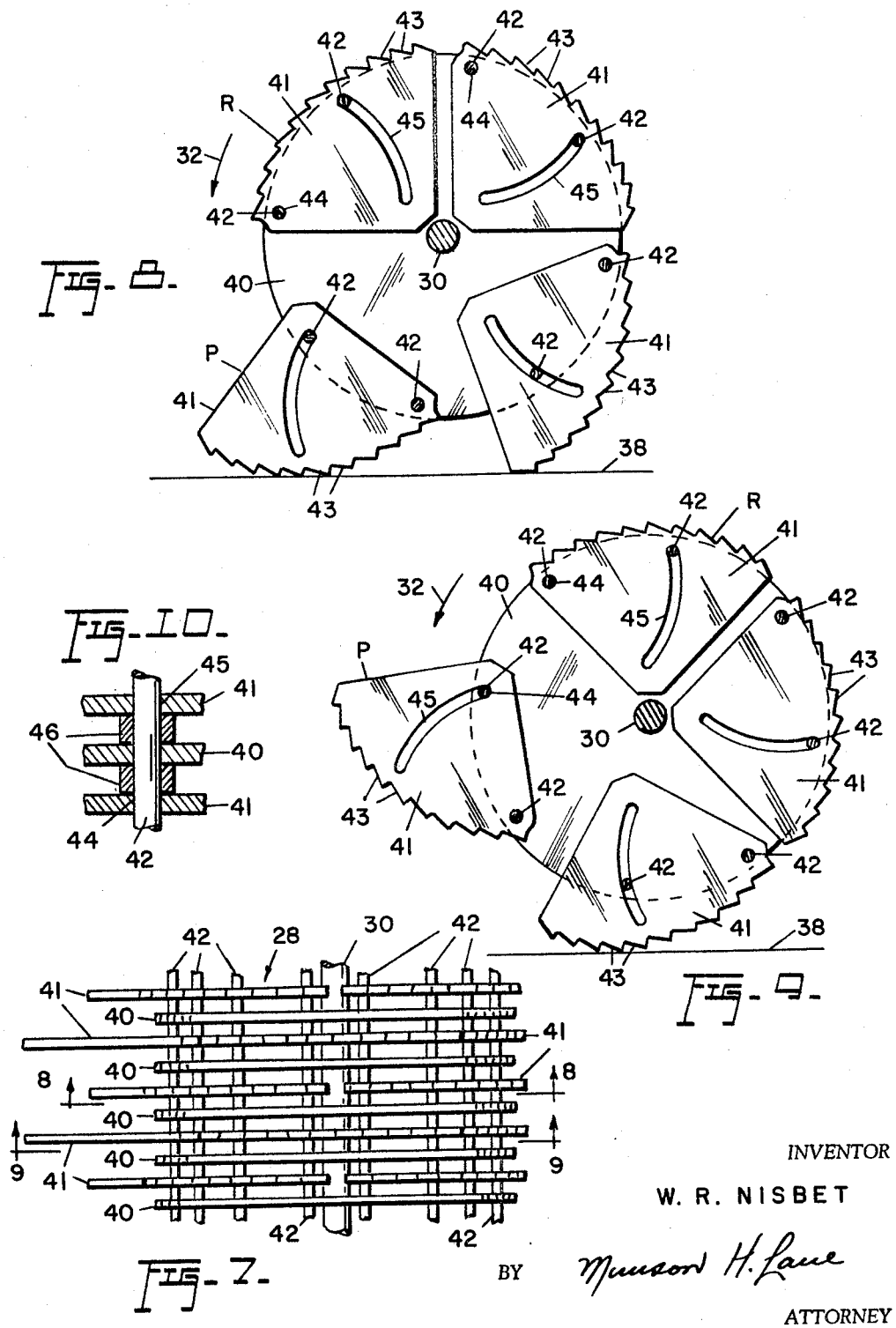
INVENTOR
W. R. NISBET
BY Munson H. Lane
ATTORNEY United States Patent Office 3,270,490
Patented Sept. 6, 1966

3,270,490
COTTON SCRAPPER
Walker R. Nisbet, San Angelo, Tex., assignor to
A. R. Nisbet & Sons, Inc., San Angelo, Tex.
Filed Nov. 5, 1963, Ser. No. 321,554
6 Claims. (Cl. 56—28)

This invention relates to new and useful improvements in machines for salvaging or recovering waste cotton which is knocked to the ground during mechanical harvesting.

Various machines have been designed for purposes of waste cotton recovery, many such conventional machines utilizing suction to pick up the cotton from the ground. However, the suction also picks up leaves, dirt and other foreign matter along with the cotton, so that most of the advantage gained by the cotton recovery is offset by the necessity of separating the foreign matter from the cotton before the cotton can be used. Other conventional machines utilize brushes or rotating brush members which sweep up the cotton from the ground, but they also suffer from the disadvantage that they pick up foreign matter as well. Still other conventional machines employ toothed rollers which are arranged so as to minimize picking up of foreign matter in order that the recovered cotton may be comparatively clean, but another difficulty is experienced in that such toothed rollers do not properly follow the contour of the ground, especially in furrows between adjacent cotton rows, with the result that much of the waste cotton remains unsalvaged.

It is, therefore, the principal object of the invention to eliminate the above outlined disadvantages of conventional machines and to facilitate highly efficient recovery of waste cotton in a clean condition.

This object is attained by the provision of a waste cotton salvaging machine, commonly known as a cotton scrapper, which utilizes a ground engaging picker head consisting of a plurality of sets of toothed sectors arranged in a drum-like formation, such sectors being pivotally mounted and adapted to lightly engage the ground without the weight of the whole picker head being applied thereto, so that the teeth of the sectors gently pick up the waste cotton from the ground without gathering foreign matter along therewith. The sectors are individually movable to their ground engaging position by gravity alone, and the drum-like formation of the picker head permits the individually movable sectors to effectively conform to ground irregularities so that the waste cotton may be efficiently picked up from sides of the cotton rows as well as from the furrows therebetween.

Another feature of the invention resides in the provision of suction means for receiving and conveying picked up cotton from the toothed sectors of the picker head, whereby the cotton is freed from the teeth of the sectors as soon as it is picked up off the ground.

In conjunction with the aforementioned suction means, another feature of the invention resides in the provision of means for delivering an air blast to the cotton stalks in the rows so as to dislodge waste cotton from under the stalks and enable the same to be picked up from sides of the rows or from the furrows by the picket head.

Other advantages of the invention reside in its simple construction, efficient and dependable operation, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 3 is a front elevational view;

FIGURE 4 is fragmentary side elevational view, similar to that shown in FIGURE 1 but with the picker head raised for purposes of transportation when the machine is not in use;

FIGURE 5 is an enlarged, fragmentary sectional view of the blower, taken substantially in the plane of the line 5—5 in FIGURE 1;

FIGURE 6 is a fragmentary vertical sectional view of the picker head, taken substantially in the plane of the line 6—6 in FIGURE 2;

FIGURE 7 is an enlarged, fragmentary top plan view of the picker head drum;

FIGURE 8 is a vertical sectional view, taken substantially in the plane of the line 8—8 in FIGURE 7;

FIGURE 9 is a vertical sectional view, taken substantially in the plane of the line 9—9 in FIGURE 7; and FIGURE 10 is an enlarged, fragmentary sectional detail showing the mounting of the picker head sectors.

Figure 2:
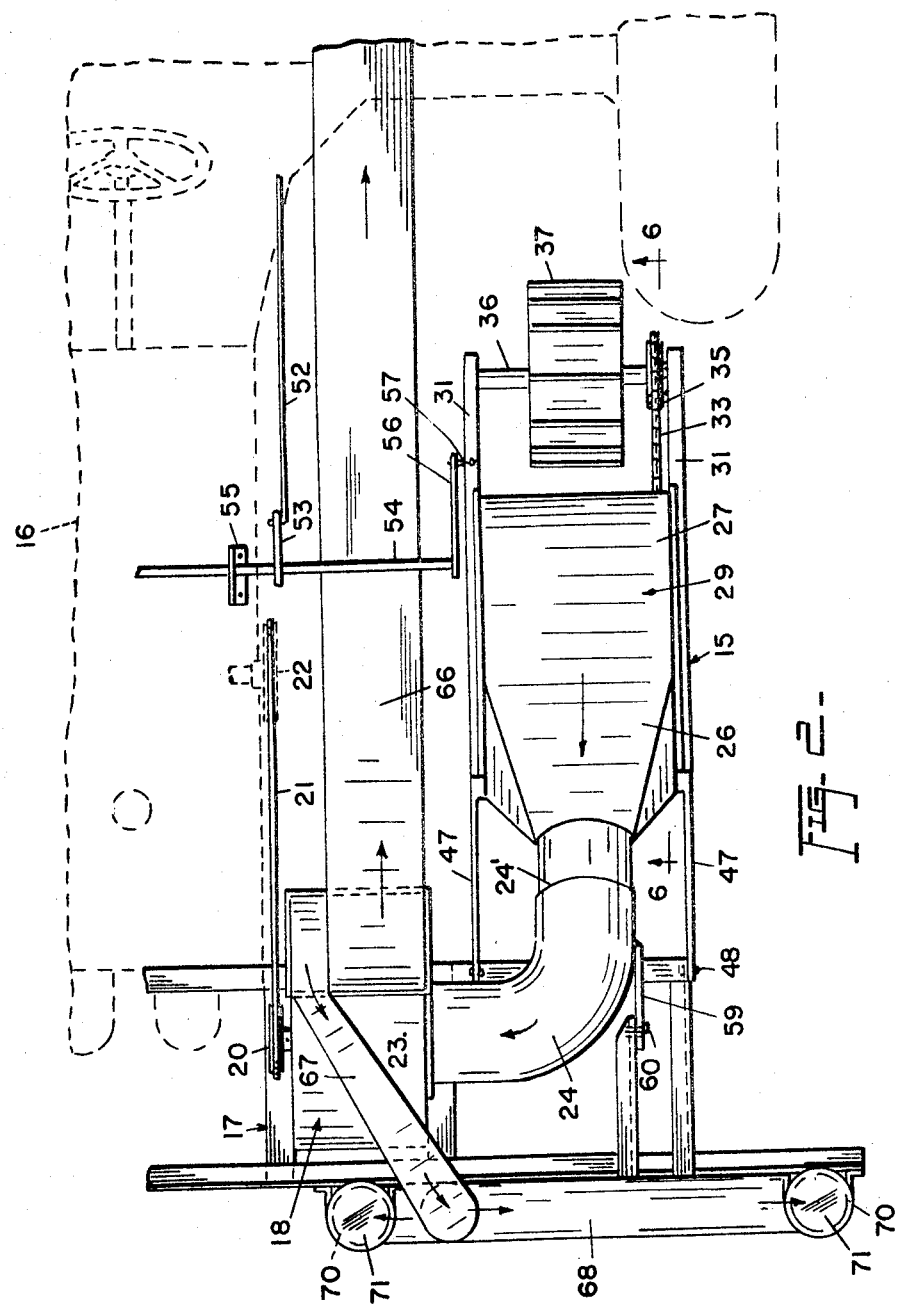
FIGURE 2 is a top plan view thereof.

Referring now to the accompanying drawings in detail, the waste cotton salvaging machine of the invention is designated generally by the reference numeral 15 and is shown as mounted upon a suitable tractor 16. For purposes of mounting the machine, the front end of the tractor is provided with a suitable framework 17 which carries, among other things, a blower unit 18, the framework 17 being so arranged that the blower unit 18 is disposed at one side of the tractor, as is best shown in FIGURE 2. The blower unit has a shaft 19 equipped with a pulley 20 which is driven by an endless belt 21 from the power take-off pulley 22 of the tractor, as will be clearly apparent.

The housing 23 of the blower 18 has an air inlet elbow 24 rotatably connected thereto as at 25 (see FIG. 5), the elbow 24 extending rearwardly and downwardly from the blower alongside of the tractor and communicating through a rearwardly divergent adaptor 26 with the housing 27 of a picker head designated generally by the numeral 29, which gathers the waste cotton from the ground.

The housing 27 of the picker head 29 contains a picker drum designated generally by the numeral 28 and hereinafter more fully described, the drum 28 being carried by and rotatably with a transverse shaft 30 which is rotatably journalled in a pair of transversely spaced side members 31 which also serve to support the housing 27. The drum 28 is rotated in the direction of travel of the machine, that is, in the direction of the arrow 32, through the medium of an endless chain 33 passing over a sprocket 34 on the shaft 30 and a sprocket 35 on a shaft 36 which is rotatably journalled in the side members 31, rearwardly of the drum 28, as is best shown in FIGURE 6. The shaft 36 carries a ground engaging wheel 37, whereby rotation of the drum 28 is effected as the machine travels over the ground indicated at 38. The diameter of the sprockets 34, 35 is such that the drum 28 is driven at a somewhat greater speed than the movement of the machine over the ground, so that waste cotton picked up by the drum is handled in a more positive manner, as will be hereinafter again mentioned.

Referring now to the construction of the picker drum 28 as shown in detail in FIGURES 7-10, the drum comprises a set of circular plates 40 which are mounted in spaced parallel relation on the drum shaft 30, and sets of sectors 41 which are pivotally mounted in the spaces between the plates 40 by means of a plurality of rods 42 which extend through the sectors and plates in parallel relation to the shaft 30. The sectors 41 are substantially in the form of quadrants when, as shown, four sectors are used as a set in each space between two adjacent plates 41. However, a lesser or a greater number of sectors may be used in each set, if so desired, in which event the angular magnitude of each sector would be larger or smaller, as the case may be. The sectors have a radius slightly larger than that of the plates 40, and the arcuate marginal edge of each sector is provided with a set of cotton picking teeth 43, which are preferably inclined in the direction of rotation 32 of the drum unit 28.

As shown in FIGURE 8, each sector 41 is provided in one outer corner thereof with an aperture 44, whereby it is swingably mounted on one of the rods 42. Moreover, the sector is also formed with an arcuate slot 45, concentric with the aperture 44, which slot slidably receives the next adjacent of the rods 42, so that the sector is free to swing between a retracted position shown at R and a projected position shown at P. In the retracted position R, the sector is concentric with the drum, but as the drum is rotated, the sector is influenced by gravity and swings to the projected position P wherein it protrudes outwardly beyond the periphery of the drum and the teeth 43 of the sector come in contact with the ground 38. As the drum continues to rotate, the sectors are automatically returned by gravity to their retracted positions, as will be readily understood from FIGURES 8 and 9. It is to be noted, however, that while FIGURE 8 shows one set of sectors, FIGURE 9 shows another set, which is the next adjacent set to that shown in FIGURE 8. The sets of sectors are staggered so that the rods 42 which pass through the apertures 44 and act as fulcrum means for the sectors in one set, pass through the slots 45 of the sectors in the next adjacent set and thus serve to limit the extent of outward and inward swinging movement of the sectors. Suitable washers or spacers 46 may be provided on the rods 42 between the sectors 41 and the plates 40, as shown in FIGURE 10.

Referring again to FIGURES 1-4, it will be noted that the side members 31 of the picker head 29 are provided with frame members 47 which are pivoted to the framework 17 as at 48, so that the whole picker head is supported by the framework at the front and by the ground engaging wheel 37 at the rear thereof. Thus, the weight of the whole picker head is not sustained by the sectors 41, but the sectors come into engagement with the ground only by their own gravitational effect when they swing from their retracted to their projected positions. This enables the teeth 43 of the sectors to gently pick up the waste cotton, with a certain amount of positive pulling action resulting from the aforementioned greater speed of rotation of the drum 28 relative to the speed of travel of the machine over the ground, and as rotation of the drum continues and the sectors with picked-up cotton on their teeth commence to be retracted into the drum, the cotton comes in contact with peripheries of the circular plates 40 of the drum and is stripped thereby from the sector teeth, thus leaving the cotton free to be conveyed by suction from the housing 27 through the adapter 26 and elbow 24 into the blower unit 18. This suction is sufficiently great to remove any cotton from the sector teeth which has not been stripped therefrom by contact with the plates 40.

The housing 27 fairly well encloses the drum unit 28 and an apron 50 of flexible material is provided in the housing, above the drum as shown in FIGURE 6, to minimize suction of air into the housing at that point. Also a pair of deflector plates 51 are provided on the side members 31 forwardly of the drum 28, for a similar purpose.

Figure 1:
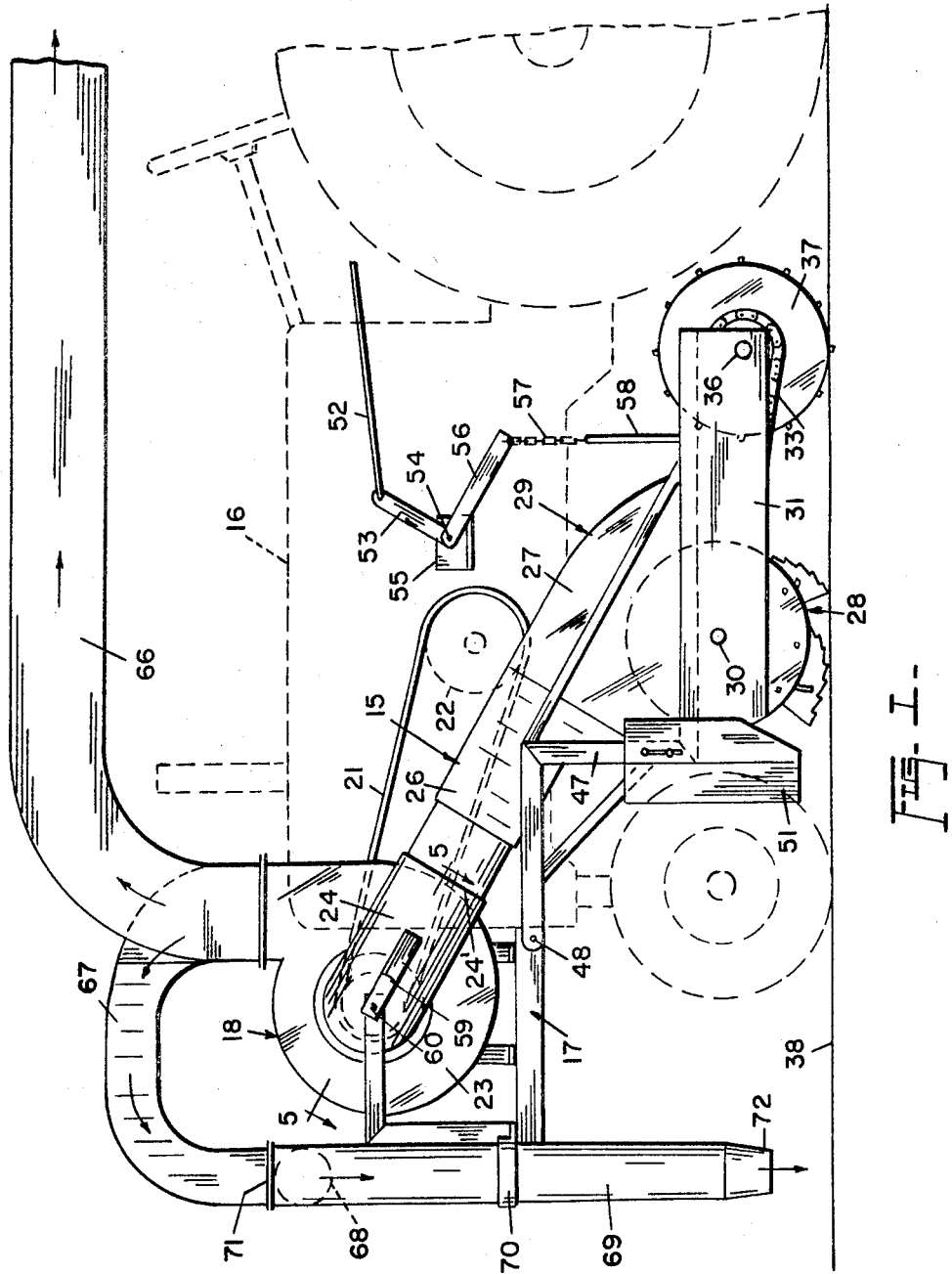
FIGURE 1 is a side elevational view of the cotton waste recovering machine of the invention, showing the same applied to a tractor illustrated by dotted lines.

As will be apparent from FIGURES 1 and 4, the picker head 29 may be raised off the ground for purposes of transportation of the machine when it is not in use, such raising being effected by a suitable control rod 52, manipulable by the operator of the tractor 16, and connected to a crank 53 on a shaft 54 which is rotatably journalled in bracket means 55 affixed to the tractor frame. The shaft 54 also carries a second crank 56 which is connected by a length of chain 57 to an upstanding hanger rod 58 on the inside member 31 of the picker head, whereby raising and lowering of the picker head may be effected by manipulation of the control rod 52, as will be clearly apparent. The raising and lowering movement of the picker head is facilitated by the rotatable connection 25 of the suction elbow 24 to the housing 23 of the blower unit 18, the elbow also carrying a support strap 59 which is pivoted to the framework 17 as at 60, coaxially with the blower shaft 19.

Referring now to FIGURE 5, it will be noted that the blower housing 23 contains a rotatable fan or impeller 61 carried by the shaft 19 and that an annular partition or flange 62 is provided in the housing, intermediate the width of the impeller, thus separating the interior of the housing into a cotton blower chamber 63 and an air blower chamber 64. A foraminous disc 65 is secured to the shaft 19 in the chamber 63 to prevent cotton which enters that chamber through the elbow 24 from gaining access to the impeller 61 and chamber 64, such cotton being blown by the air stream from the impeller into a delivery duct 66 which communicates with the chamber 63. The cotton passes through the delivery duct 66 into a suitable receptacle (not shown).

The blower chamber 64 communicates with an air duct 67 which is separate from the duct 66 and carriers air under pressure to a transverse tube 68, communicating at its ends with a pair of vertical blower ducts 69 which are supported on the framework 17 by suitable clamps 70. The upper ends 71 of the ducts 69 are closed, but their lower ends 72 are in the form of nozzles whereby air under pressure from the blower 18 is discharged directly onto stalks of plants in two transversely spaced rows of cotton, so that any cotton balls such as may be lodged under the stalks are loosened by the air blast and freed to fall on the sides of the rows or into the furrow therebetween, for subsequent salvaging by the picker head 29.

It will be noted that the machine 15 has been shown as mounted at one side of the tractor 16, in an instance where a single machine at only one side of the tractor is desirable. However, the arrangement may obviously be duplicated on the other side of the tractor, if so preferred.

The aforementioned inlet elbow 24 is preferably made of two complemental sections which are slidably telescoped together as at 24' so that the elbow as a whole, pivoting about the point 60 may extend and contract during raising and lowering of the picker head 29, while the picker head frame members 47 pivot about the point 48 which is offset from the pivot point 60.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a waste cotton salvaging machine, a picker head comprising a rotatable drum-like body consisting of a plurality of spaced parallel circular plates, a rotatable shaft having said plates mounted thereon, and sets of toothed sectors pivotally mounted between said plates for swinging movement from a retracted to a projected position and vice versa by gravity, said sectors in their projected position being engageable with the ground to pick up cotton therefrom.

2. The device as defined in claim 1 together with means for limiting the swinging movement of said sectors at their retracted and projected positions.

3. The device as defined in claim 1 wherein the teeth of said sectors in their retracted position are disposed adjacent the peripheries of said circular plates, whereby the latter may strip cotton from the sector teeth.

4. The device as defined in claim 1 together with a housing enclosing said drum-like body, and blower means connected to said housing for conveying picked up cotton away from said sectors.

5. The device as defined in claim 1 together with ground engaging means provided on said picker head for supporting its weight on the ground independently of the ground engagement by said sectors.

6. The device as defined in claim 1 together with ground engaging means provided on said picker head and operatively connected to said drum-like body for rotating the same.

References Cited by the Examiner
UNITED STATES PATENTS

| | | | |
|---|---|---|---|
| 2,440,770 | 5/1948 | Hagan | 302—37 |
| 2,707,364 | 5/1955 | Wagnon | 56—30 |
| 2,715,809 | 8/1955 | Buell | 56—28 |
| 2,730,855 | 1/1956 | Thomas | 56—28 |
| 2,896,398 | 7/1959 | Green | 56—48 |
| 2,938,321 | 5/1960 | Tieman | 56—12 |
| 3,100,368 | 8/1963 | Logan | 56—12 |
| 3,101,581 | 8/1963 | Kelso et al. | 56—28 |

ABRAHAM G. STONE, *Primary Examiner.*

RUSSELL R. KINSEY, *Examiner.*